United States Patent Office 3,743,716
Patented July 3, 1973

3,743,716
SWEETENING COMPOSITIONS CONTAINING
AGLYCONIC DIHYDROCHALCONES
George P. Rizzi, Springfield Township, Hamilton County, and James S. Neely, Hamilton, Ohio, assignors to The Procter & Gamble Company, Cincinnati, Ohio
No Drawing. Filed Sept. 30, 1970, Ser. No. 76,973
Int. Cl. A23l 1/26
U.S. Cl. 424—49
19 Claims

ABSTRACT OF THE DISCLOSURE

Sweetening compositions comprising a co-dissolved sugar alcohol, or glycerol, and an aglyconic dihydrochalcone.

BACKGROUND OF THE INVENTION

This invention relates to compositions for imparting sweetness to ingestible materials such as foods, beverages, oral compositions and the like, without the use of natural sugars. This invention also relates to a method for enhancing the natural sweetness of sugar alcohols and glycerol by co-dissolution of certain aglyconic dihydrochalcones therewith. The resulting sweetening compositions are non-cariogenic by virtue of the fact that they contain no natural sugars.

Heretofore, various synthetic agents have been commonly employed to provide low calorie, non-cariogenic sweeteners. However, certain of the common artificial sweeteners, such as the cyclamates, have recently come under governmental restriction and are no longer in common use. Other compounds, such as saccharin, are not suitable for use as the sole sweetening agent in most food and beverage compositions due to their persistent, bitter aftertaste which is perceived by most users. On the other hand, such artificial sweeteners do have the advantage that they are non-cariogenic. This non-cariogenicity apparently arises from the fact that these artificial sweetener compounds are not metabolized by oral bacteria to form acids in the mouth, said acids being the primary cause of dental caries.

While saccharin and the cyclamates have been in common use as artificial sweetening agents for a number of years, there has been more recently discovered a series of new artificial sweeteners which can be broadly classified as dihydrochalcones. For example, Horowitz and Gentili, U.S. Pat. 3,087,821, teach the use of various dihydrochalcones having sugar substituents (glyconic dihydrochalcones) as sweetening agents. The concurrently filed application of Rizzi, entitled "Dihydrochalcone Sweetening Agents," Ser. No. 76,972, filed Sept. 30, 1970 discloses the use of certain aglyconic dihydrochalcones as sweetening agents. While these sweeteners are effective and satisfactory substitutes for the natural sugars in many applications, they suffer from various drawbacks, including a persistent aftertaste when used in high concentrations, expense and the potential ability to be metabolized to yield acid-forming sugars.

Another method for producing sweetening compositions having a lower cariogenicity than the natural sugars would be to potentiate the sweetness of the natural sugars so as to thereby allow a reduction in the total sugar content of the ingestible material being sweetened. U.S. Patent 3,282,706, to Moller and Morris, describes a means for potentiating the sweetness of sugar using ammoniated glycyrrhizin. Another method for potentiating the sweetness of natural sugars is described in the concurrently filed application of Rizzi, entitled Sugar Compositions Containing Aglyconic Dihydrochalcones, Ser. No. 76,974, filed Sept. 30, 1970 wherein small amounts of solubilized aglyconic dihydrochalcones are used to enhance the sweetness of various natural sugars.

While sugar compositions having artificially potentiated sweetness levels can be used in many applications where a low-cariogenic sweetener is desired, it will be recognized that such sweeteners still contain considerable quantities of sugars which can be metabolized to form acids in the mouth. Hence, such compositions do not fulfill the need for a truly non-cariogenic sweetener. It would be incongruous, for example, to sweeten a dentifrice composition designed to provide anti-caries prophylaxis with any kind of natural sugar.

The natural sugars can, in broad terms, be described as polyhydroxy aldehydes and ketones, and condensates thereof. It has long been recognized that sugars can be reduced with hydrogen at the carbonyl functionality, either aldehydic or ketonic, to yield what are commonly referred to as the sugar alcohols. Such sugar alcohols are often found to have sweetness qualities reminiscent of the parent sugar but which, in general, are not as strong as the parent sugar. Another sweet compound of this general type is glycerol, which could be considered a sugar alcohol of a triose sugar. Since the sugar alcohols and glycerol are not as sweet as the parent sugars, they have not heretofore been extensively used in foods, beverages, oral products and the like, as sweetening agents, although they do find utility in many such compositions as humectants and serve to improve the textural qualities of the materials wherein they are incorprated. When so used, artificial sweeteners or natural sugars are commonly employed with glycerol and the sugar alcohols to provide the major sweetening component in the food, beverage, etc. The sugar alcohols and glycerol are widely recognized as being almost, or completely, non-cariogenic by virtue of the fact that they are not metabolized to acids by oral bacteria. However, the utility of these materials has heretofore been limited by virtue of their inadequate sweetness properties. The inadequate sweetness properties of the sugar alcohols and glycerol is manifested not only by a lower sweetness level than the natural sugars, but also by the slow rate at which the sweetness of these compounds manifests itself to the user. Hence, the flavor impact of these materials is one of only modest sweetness.

It has now been found that certain aglyconic dihydrochalcones of the type hereinafter described can be co-dissolved with certain sugar alcohols and with glycerol and enhance the natural sweetness qualities of these latter materials to such an extent that they are made suitable for use as sweeteners. It will be recognized that said sweeteners, by virtue of the fact that they contain no natural sugars, will be non-cariogenic and low in calories.

Accordingly, it is a primary and major object of the present invention to provide improved sweetening compositions. Another object of the present invention is to provide sweetening compositions comprising mixtures of certain aglyconic dihydrochalcones co - dissolved with glycerol and the sugar alcohols. Still another object of this invention is to provide low calorie, non-cariogenic sweeteners. These and other objects are obtained by the present invention as will become apparent from the following disclosure.

SUMMARY OF THE INVENTION

The sweetening compositions of this invention comprise a sugar alcohol, or glycerol (all hereinafter referred to generically as "poly-ols") co-dissolved with an aglyconic dihydrochalcone as hereinafter defined. Mixtures of the polyols are also suitable for use herein. In its process aspects, this invention comprises a method for potentiating the sweetness of the sugar alcohols and glycerol and a method for sweetening foods, beverages, oral products and the like, by co-dissolving therein a sugar alcohol, or glycerol, and one of the hereinafter detailed aglyconic dihydrochalcones, all in the proper proportions.

More specifically, the present invention encompasses sweetening compositions comprising from about 1% to about 99%, by weight, of a poly-ol compound of the formula

(I)

wherein $n$ is 1 to 4, co-dissolved with a dihydrochalcone compound of the formula

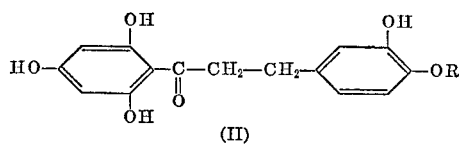

(II)

wherein R is a member selected from the group consisting of methyl and ethyl, at a weight ratio of poly-ol compound to dihydrochalcone compound in the range from about $1:10^{-6}$ to 1:1 with the balance of said composition being a solvent selected from the group consisting of ingestible polar, organic liquids, and mixtures of polar, organic liquids and water containing at least about 0.1% by weight of said ingestible polar, organic liquids.

In addition, this invention provides a process for enhancing the sweetness of poly-ol compounds of Formula I comprising co-dissolving therewith a dihydrochalcone compound of Formula II at a weight ratio of poly-ol to dihydrochalcone in the range from about $1:10^{-6}$ to 1:1 in a co-solvent selected from the group consisting of ingestible polar, organic liquids, and mixtures of ingestible polar, organic liquids and water containing at least about 0.1% by weight of said ingestible polar, organic liquids.

Finally, this invention provides a process for sweetening ingestible materials comprising co-dissolving therein a poly-ol compound of the Formula I and a dihydrochalcone selected from the group consisting of hesperetin dihydrochalcone and homohesperetin dihydrochalcone, i.e., the compounds of Formula II, such that the concentration of poly-ol in the ingestible material is in the range from about 3% to about 70% by weight of ingestible material and the dihydrochalcone is co-dissolved in the ingestible material at a weight ratio of poly-ol to dihydrochalcone in the range from about $1:10^{-6}$ to 1:1. This latter process preferably comprises the steps of: (a) co-dissolving from about 3% to about 70% by weight of a poly-ol compound of the formula $HOCH_2(CHOH_nCH_2OH$, wherein $n$ is 1 to 4, with a member selected from the group consisting of hesperetin dihydrochalcone and homohesperetin dihydrochalcone at a weight ratio of poly-ol to dihydrochalcone in the range from about $1:10^{-6}$ to about 1:1 in a co-solvent which is a member selected from the group consisting of ingestible polar, organic liquids and mixtures of ingestible polar, organic liquids and water containing at least about 0.1% by weight of said polar, organic liquids; and (b) admixing the solution of step (a) with an ingestible material such that the final concentration of dissolved poly-ol in the ingestible material is at least about 3%, by weight.

When R in the above Formula II is methyl, the compound is hesperetin dihydrochalcone, which is preferred for use herein to enhance the sweetness of poly-ols of Formula I. Hesperetin dihydrochalcone can be prepared from hesperidin by hydrolysis in aqueous mineral acid, followed by catalytic hydrogenation, as hereinafter detailed. Alternatively, hesperetin dihydrochalcone glucoside, prepared by the method of Horowitz, U.S. Patent 3,429,873, can be subjected to further hydrolysis with removal of the β-D-glucose moiety and recovery of the aglycone, hesperetin dihydrochalcone. Likewise, U.S. Patent 3,375,242 describes a process for condensing naringin with isovanillin to yield neohesperidin chalcone which, on hydrogenation and complete hydrolysis of the sugar, yields hesperetin dihydrochalcone. Hesperetin dihydrochalcone prepared by any of these methods is suitable for use in the practice of the present invention.

When R in Formula II is ethyl, the compound is homohesperetin dihydrochalcone which is also suitable for use herein. This compound is prepared from homoneohesperidin, which is prepared by the method of Krbechek et al., J. Agr. Food Chem., 16 108 (1968) as hereinafter detailed. Of the two aglyconic dihydrochalcones suitable for use in the practice of this invention, hesperetin dihydrochalcone is the more preferred.

As hereinabove noted, the glycerol and sugar alcohols used in the present invention are poly-ols containing from 3 to 6 carbon atoms. These materials are manufactured on an industrial scale by a variety of well-known processes. For example, glycerol is commonly recovered as a by-product from the saponification of animal and vegetable fats. As their name implies, the sugar alcohols can be prepared from various natural sugars and this preparation most generally involves the catalytic hydrogenation of the carbonyl group of the particular sugar and its reduction to an alcohol functionality. For example, sorbitol, one of the most common sugar alcohols, is prepared by the nickel-catalyzed hydrogenation of the aldohexose, glucose. Sorbitol can also be recovered from the berries of the mountain ash (*Sorbus aucuparia*) and from the red seaweed (*Bostrychia scorpoides*); sorbitol obtained from any of these sources is suitable for use in the practice of the present invention. Other sugar alcohols can be prepared by various, well-known processes. For example, electrolytic reduction of glucose at pH 10–13 produces a mixture of mannitol and sorbitol which can be separated and the mannitol recovered; alternatively, the mixture can be used herein. Mannitol can also be recovered from the exudates of the olive tree. Galactitol can be made by the catalytic hydrogenation of galactose. An important sugar alcohol which has been suggested for use as a non-cariogenic sweetening agent is xylitol, a pentose alcohol which can be prepared by the reduction of the aldopentose sugar, xylose. It will be recognized that any of the natural sugars can be reduced at the carbonyl functionality to provide sugar alcohols of the type employed in this invention. It will be further recognized that not all of the sugar alcohols exhibit the same degree of sweetness and, although the sweetness of any of the sugar alcohols and glycerol can be enhanced and potentiated when co-dissolved with the aglyconic dihydrochalcones as herein detailed, certain of the sugar alcohols will be preferred in the practice of this invention. Preferred for use herein are the sugar alcohols sorbitol, mannitol and xylitol. Glycerol is also preferred for use herein. Mixtures of these poly-ols are also preferred.

In the practice of this invention a dihydrochalcone of Formula II is co-dissolved with the selected sugar alcohol, mixtures of sugar alcohols, or with glycerol to enhance the natural sweetness of these poly-ol materials and to yield sweetening compositions. These aglyconic dihydrochalcones, when dissolved in the proper solvents in concentrations of $5 \times 10^{-4}$ molar, or greater, in the manner detailed by Rizzi, above, are themselves sweet. However, when used in the practice of this invention it is not necessary to use such high concentrations of these materials. That is to say, when concentrations of these compounds below their minimum perceptible sweetness concentration ($5 \times 10^{-4}$ molar) are properly co-dissolved in the manner hereinafter disclosed with any of the sugar alcohols, glycerol and mixtures thereof, they enhance the sweetness of these poly-ols. Of course, if it is so desired, solution concentrations of these dihydrochalcones greater than about $5 \times 10^{-4}$ molar can be used in conjunction with said sugar alcohols and glycerol to provide compositions of even greater sweetness. Since the concentration of poly-ol used in the sweetening compositions of this invention can vary over the range from 1% to about 99%, as hereinafter disclosed, it is convenient for the formulator of such sweetening compositions to use a ratio of poly-ol to dihydrochalcone within a given, optimum range to enhance the sweetness of the poly-ols. Most generally, a weight ratio of poly-ol to aglyconic dihydrochalcone in the range from about 1:10$^{-6}$ to 1:1, more preferably from about 1:10$^{-6}$ to 1:10$^{-3}$, serves to promote the natural sweetness of the poly-ols to levels comparable to that of sucrose. At the same time, by using minimal concentrations of the dihydrochalcones within the ratio range indicated, the flavor qualities of the sugar alcohols and glycerol are not altered but only changed in intensity and rate of flavor impact.

Simple admixture of the poly-ol and the dihydrochalcone does not result in the desired sweetness-enhancing effect. Therefore, it is a critical aspect of this invention that a suitable co-solvent for the dihydrochalcone component and the poly-ol component be employed. The sugar alcohols and glycerol are all almost completely soluble in water and are also soluble in a variety of polar, organic liquids. The dihydrochalcones employed herein are almost entirely insoluble in water, but are soluble in various polar, organic liquids. The dihydrochalcones are also soluble in mixtures of said liquids and water. It is therefore possible to provide organic solvents and organic-aqueous solvents properly formulated to co-dissolve the poly-ol and the dihydrochalcone, thereby enhancing the natural sweetness of the poly-ol and providing sweetening compositions.

The solvents suitable for co-solubilizing the dihydrochalcones of Formula II and poly-ols of Formula I are any of the polar, organic liquids and water containing said polar, organic liquids in the amounts hereinafter detailed. Of course, when it is desired to prepare artificial sweetening compositions suitable for prolonged or repeated ingestion by humans it is necessary to use as the co-solvent for the herein-used aglyconic dihydrochalcones and poly-ols a polar, organic liquid which is toxicologically acceptable. The hereinafter noted classes of polar, organic liquids can all be ingested to a greater or lesser extent by humans without ill effects. For example, many of the organic acids are found in oxidized fat mixtures and acetic acid is a well-known constituent of vinegar. As is hereinafter noted, organic acid esters are major components of most naturally-occurring flavor oils. Mercaptans are found in vegetables such as the onion and in garlic, while a variety of polar, organic liquids are known to be present in the so-called "fusel oil" component of alcoholic beverages. Many of these polar, organic liquids cause no ill effects if ingested occasionally and in low concentrations, but some should be avoided if repeated use is anticipated. Accordingly, there are certain preferred polar, organic liquids which can be employed herein singly, in combination one with another and with water, and serve to co-dissolve the dihydrochalcones of Formula II and the poly-ols of Formula I, thereby enhancing the natural sweetness of said poly-ols. These preferred, polar, liquid, organic compounds are sometimes hereinafter referred to as ingestible organic solvents. Preferred, ingestible, polar, organic liquid solvents suitable for use herein, singly, in admixtures and with water for the preparation of artificial sweetening compositions containing a poly-ol co-dissolved with hesperetin dihydrochalcone or homohesperetin dihydrochalcone include the ingestible members of the hereinafter disclosed classes of polar, organic liquids, especially those detailed in the list of permitted food additives periodically prepared and issued by the United States Food & Drug Administration and published in the Federal Register, and commonly referred to as the GRAS (Generally Recognized As Safe) list.

Another group of ingestible organic solvents useful herein are the polar, organic liquids classified as safe for limited use in foods under the provisions of regulation 121.1164 of the U.S. Food and Drug Administration. A wide variety of ingestible polar, organic liquids are in this category. For example, certain liquid alcohols and glycols, low molecular weight organic acids (i.e., $C_2$–$C_{10}$) organic acid esters, aldehydes, and ketones, aromatic as well as aliphatic and mixtures thereof, serve to co-solubilize the dihydrochalcones and poly-ols and can be used herein, either alone or in mixtures. Ketones such as acetophenone, 3-decen-2-one, isopulegone and the like, all serve as co-solvents herein. Aldehydes, such as benzaldehyde, decanal and the like, are similarly useful herein. A variety of alcohols can also be used to co-dissolve the aglyconic dihydrochalcone materials and the poly-ols used in the practice of this invention, thereby enhancing the natural sweetness of said poly-ols and providing artificial sweetening compositions. Ethyl alcohol, cedrol, 3-hexen-1-ol, neopentyl alcohol, 1-decanol, sorbitan monooleate polyoxyethylene and the like, are all suitable for use in this co-solvent function, singly, in admixture one with another, and in water.

The liquid organic esters of the formula R″COOR″, wherein R″ represents straight-chain and branched alkyl groups having 1 to 10 carbon atoms, represent a preferred class of solvents for use herein. The usefulness of such esters arises both because of their good solvent properties and by virtue of the fact that many esters are suitable for prolonged ingestion, themselves being major components of most natural flavor oils. Nonlimiting examples of esters useful as ingestible polar, organic liquid, solvents herein include: pentyl pentanoate, isobutyl formate, ethyl acetate, amyl valerate, isoamyl valerate, butyl butyrate, isobutyl propionate, isoamyl decanoate, ethyl propionate, ethyl butyrate, isoamyl acetate and isobutyl valerate, all of which are suitable for use singly, in admixtures, and with water as co-solvents in the instant invention.

Various naturally-occurring and synthetically-reconstituted flavor oils which are obtainable from plants are suitably employed to co-dissolve the dihydrochalcones and poly-ols used in this invention. It is not possible to specify with certainty the compositions of these various oils other than that they are highly complex liquid mixtures containing polar compounds such as lactones, ketones, aldehydes, thiols, acids and acid esters. Some flavor oils contain nitriles, imides, organonitrates and the like. A long history for use by humans has shown that such flavor oils are physiologically acceptable and they are thus also preferred for use as ingestible organic solvents herein. Often, such flavor oils are employed with ethyl alcohol and propylene glycol to provide various extracts, tinctures and concentrates containing said oils and it is a contemplated mode of the practice of this invention that such solutions be used as co-solvents herein. These naturally-occurring, ingestible organic solvent oils can also be used concurrently with water and any of the above-noted preferred solvents. Non-limiting examples of flavor oils suitable for employment as co-solubilizing agents for the poly-ols and the aglyconic dihydrochalcones of Formula II include: oil of sweet birch, oil of spearmint, oil of wintergreen, oil of sassafras, cedar wood oil, anise oil, pine oil, dill oil, celery seed oil, various citrus oils including lemon, orange, lime, tangerine and grapefrut oils, clove oil, peppermint oil, cassia, carrot seed oil, cola concentrate, ginger oil, angelica oil and the like, and mixtures thereof, all of which can be used in the practice of this invention as co-solvents. These oils are obtained from the appropriate plant sources by extraction in the manner well-known to those skilled in the art.

Any of the above-described ingestible polar, organic liquids can be used in conjunction with water to provide aqueous-organic solvent systems which serve to co-dissolve the aglyconic dihydrochalcones and the poly-ols and provide sweetening compositions. For example, hesperetin dihydrochalcone can be co-dissolved with sorbitol in ethyl alcohol and then diluted with water to yield a 0.001% solution of said dihydrochalcone containing five percent ethyl alcohol and thirty percent sorbitol, which composition is suitable for sweetening foods and beverages. In like fashion, ethyl acetate can be used to dissolve hesperetin dihydrochalcone and xylitol and can be diluted thence with water to yield a composition containing about a $5 \times 10^{-5}\%$ concentration of dihydrochalcone and twenty percent xylitol, said composition being likewise suitable for sweetening foods and beverages. Alternatively, hesperetin dihydrochalcone can be co-dissolved with a solution of twenty percent sorbitol in ethyl alcohol at a $2 \times 10^{-5}\%$ concentration and the solution employed as a sweetening composition. Thus, it is seen that co-dissolution of the dihydrochalcones of Formula II and the various poly-ols as herein defined by Formula I, in ingestible polar, organic liquids, in mixtures thereof, and in mixtures thereof and water, results in solutions suitable for use as artificial sweetening agents.

Especially preferred ingestible solvents used herein are orange oil, tangerine oil, lemon oil, lime oil, grapefruit oil, spearmint oil, peppermint oil, clove oil, ethyl alcohol, 1,2-dihydroxypropane, acetic acid, isoamyl acetate, isoamyl valerate, butyl butyrate, isobutyl propionate and sorbitan monooleate polyoxyethylene, singly, in combination and in combination with water.

Co-dissolution of the aglyconic dihydrochalcone of Formula II and the poly-ol of Formula I so as to enhance thereby the natural sweetness of the poly-ol can be accomplished by simple admixture with any of the solvent compositions herein noted. Gentle warming can be employed to speed the rate of dissolution but this is entirely optional as these compounds are found to be quite soluble in the above-noted solvents. When heating is employed, temperatures of from 40° C. to 90° C. are suitable. Preparation of aqueous-organic solutions of the dihydrochalcone and poly-ol, which are preferred herein, can be accomplished by dissolving the dihydrochalcone in the ingestible polar, organic liquid and admixing the resulting solution with water containing the poly-ol, and also by simply adding the dihydrochalcone to a mixture of water, poly-ol and ingestible polar, organic liquid. Both of these methods are suitably employed in the practice of this invention but it is usually found to be quicker to dissolve the dihydrochalcone in the ingestible polar, organic liquid and then to admix the resulting solution with the poly-ol dissolved in water. The amount of ingestible organic solvent required to dissolve the dihydrochalcones employed herein is not critical since any of the above-named solvents will dissolve sufficient material to provide compositions well within the preferred range of poly-ols and dihydrochalcones taught herein to be sweetening compositions. Generally, weight ratios of organic solvent:dihydrochalcone of about 1:1, and greater, are employed, with ratios greater than about 10:1 being preferred. Similar organic solvent ratios are suitable for dissolving the type (I) poly-ols, and it may therefore be seen that said ratios are satisfactory in co-solubilizing the poly-ols and the dihydrochalcones. When aqueous-organic solvent systems are employed to co-dissolve the poly-ol and the dihydrochalcone, the total concentration of polar, organic liquid needed to insure solubility of the dihydrochalcone in the water depends to some extent on the amount of dihydrochalcone to be dissolved (solubility of the poly-ols in water is no problem since the water solubility of these compounds is exceptionally high). In general, a ratio of one part dihydrochalcone to one part ingestible polar, organic liquid will insure solubility of said dihydrochalcone in water. However, the total concentration of the ingestible, organic solvent in the resulting solution should be not less than 0.10%, more preferably not less than 0.25%, by weight of total solvent.

As hereinbefore noted, many of the ingestible polar, organic liquids which can be used to co-dissolve the poly-ols and the dihydrochalcones, especially the esters, have flavor properties of their own and are recognized as being major constituents in many natural flavor oils. Thus, when such solvents are used herein, even at low concentrations, they will impart to the food being sweetened some of their own flavor; this is sometimes desirable. However, when it is desired to prepare artificial sweetening compositions comprising glycerol or one of the sugar alcohols in combination with either hesperetin dihydrochalcone or homohesperetin dihydrochalcone having essentially no flavor sensation other than that of the enhanced natural sweetness of the poly-ol, it is necessary to employ as the organic co-solvent a material having little, or no, flavor properties of its own. Of course, the compounds must serve to co-solubilize the dihydrochalcone and the poly-ol. Two ingestible organic solvents which fulfill these requirements are ethyl alcohol and 1,2-dihydroxypropane and these solvents are preferred for use herein when it is desired to prepare artificial sweetening compositions having no additional flavor properties. Of course, such sweetening compositions prepared with ethyl alcohol or 1,2-dihydroxypropane can be flavored by the addition of flavor oils, if so desired.

The useful concentration of 1,2-dihydroxypropane in the sweetening compositions comprising a poly-ol of type (I) and a dihydrochalcone of type (II) is limited by the astringency of this compound. For this reason, sweetening compositions containing this solvent preferably contain no more than about three percent of the 1,2-dihydroxypropane, the remainder of the solvent being water or ethyl alcohol. Alternatively, more concentrated solutions of 1,2-dihydroxypropane, or the compound itself, can be used in the preparation of concentrated sweetening compositions which, in use, are diluted so that the amount of 1,2-dihydroxypropane in the sweetened food is below the astringency level.

When ethyl alcohol is selected as the ingestible organic solvent for use in this invention it can be used singly and in various proportions with water. It is to be noted that both the poly-ols of Formula I and the dihydrochalcones of Formula II are highly soluble in ethyl alcohol and water-ethanol mixtures. Solutions of these compounds in the concentration ranges herein disclosed in pure ethanol, and ethanol-water mixtures containing from about 0.1% to 99% ethanol are all suitable for use as sweetening compositions.

When it is desired to sweeten ingestible materials such as food, beverages, candies, confections, oral compositions and the like, by the practice of this invention and said ingestibles are flavored by the addition of natural or synthetic flavoring oils, the dihydrochalcones and poly-ols can be simply dissolved in said flavor oils prior to use. Thus, the resulting food or beverage is flavored and sweetened simultaneously by the addition of the flavor oil-solubilized dihydrochalcone-poly-ol combination and no solvent other than the flavor oil, is required. Of course, any of the hereinbefore disclosed organic solvents can be used as a co-solvent if so desired.

The following procedures illustrate the preparation of hesperetin and homohesperetin dihydrochalcone which, when suitably co-solubilized with the poly-ols of Formula I according to the process of this invention, result in a marked enhancement of the natural sweetness of said poly-ols and provide sweetening compositions.

PREPARATION OF HESPERETIN DIHYDROCHALCONE

A solution of hesperidin (25 g.) in 125 ml. of 10% aqueous potassium hydroxide was allowed to remain at 25° C. for 30 minutes. Then 2.0 g. 10% Pd/charcoal catalyst was added and the mixture was hydrogenated on a pressure apparatus for 18 hours under 30 p.s.i.g. $H_2$ pressure. The hydrogenation mixture was filtered to remove the catalyst and the volume of filtrate was adjusted to 300 ml. by adding water. Then 2.5 ml. of concentrated HCl were added and the mixture was refluxed for five hours. The reaction mixture was cooled to 25° C. and extracted with three-250 ml. portions of ethyl acetate. Evaporation of the ethyl acetate under reduced pressure gave a reddish/yellow oil which was subsequently suspended in water (about 100 ml.) and extracted twice with 250 ml. portions of diethyl ether. Evaporation of the ether under reduced pressure gave crude, crystalline hesperetin dihydrochalcone which was then recrystallized from 2:1 ethanol/water to yield (after vacuum drying at 25° C.) 11.32 g. (90% yield based on hesperidin) of pure hesperetin dihydrochalcone. A sample of hesperetin dihydrochalcone which was recrystallized repeatedly (four times) from 2:1 ethanol/water and dried two hours at 56° C. under 0.1 mm. Hg pressure had a melting point of 144–146° C. (dec.).

*Analysis.*—Calculated for $C_{16}H_{16}O_6 \cdot \frac{1}{2}H_2O$ (percent): C, 61.4; H, 5.4. Found (percent): C, 61.8, 61.9; H, 5.9, 5.7.

PREPARATION OF HOMOHESPERETIN DIHYDROCHALCONE

A mixture of 1.0 g. of homoneohesperidin, M.P. 219–223° C., prepared by the method of Krbechek, et al., J. Agr. Food Chem., 16, 180 (1968), 25 ml. water, 25 ml. ethanol and 0.5 ml. of concentrated $H_2SO_4$ was refluxed for 72 hours. The cooled (25° C.) reaction mixture was diluted with water and extracted three times with ethyl acetate (about 100 ml. each time). The ethyl acetate solution was dried over anhydrous $MgSO_4$, filtered to remove drying agent and concentrated under reduced pressure to yield a brownish oil. The oil was crystallized from aqueous isopropanol to yield 0.207 g. (42% yield) of homohesperetin having an M.P. of 85–88° C. The product was shown to be homogeneous by thin layer chromatography. The $^1H$ NMR spectrum obtained in DMSO-$d^6$ supported the structure claimed in that the following signals were observed: $\delta$ 0.79, triplet, J=6 Hz. and $\delta$ 0.24 quartet, J=6 Hz. (ethoxy group), the ratio of methyl/methylene/aromatic protons was in the expected ratio of 3:2:5.

The homohesperetin, 0.173 g. (M.P. 85–88° C.), was then dissolved in 20 ml. of 8.5% aqueous KOH, 0.143 g. of 10% Pd/charcoal catalyst was added and the mixture was hydrogenated with $H_2$ under atmospheric pressure for 4.0 hours during which time one molar equivalent of hydrogen was absorbed. The reaction mixture was filtered and the filtrate was acidified by adding 4 N HCl (pH ca. 2). The white precipitate which separated was collected by filtration and dried in air. The dried product comprised 0.117 g. (67% yield) of homohesperetin dihydrochalcone with a melting point of 96.5–97.5° C. The compound was shown to be homogeneous by thin layer chromatography and its structure was verified by $^1H$ NMR analysis in DMSO-$d^6$ solution: $\delta$ 0.69 triplet, $\delta$ 2.22 quartet (ethoxy group), $\delta$ 1.17, four broad peaks due to adjacent methylenes flanked by a carbonyl group and an aromatic ring, and by infrared analysis of a sample in KBr: broad absorption at 6.25–6.45$\mu$ (strongly hydrogen bonded carbonyl group, typical of phloroacetophenone type molecules).

The polyols, i.e., glycerol and sugar alcohols, hereinabove disclosed for use in this invention are soluble in water and any of the ingestible polar, organic liquid solvents and solvent mixtures hereinabove disclosed. The solid poly-ols can be dissolved in any of the herein-disclosed solvents and solvent mixtures in concentrations from about 1% to about 99%, by weight. At the lower concentrations, the poly-ols are almost imperceptibly sweet, hence, a more preferred range of concentrations is from about 3% to about 70%, by weight. Glycerol, due to its hygroscopicity and low melting point, is generally encountered as a 95% solution, rather than as a pure solid. As such, it need not be dissolved in a solvent in the practice of this invention. However, an ingestible polar, organic liquid must be used, in the manner herein detailed, to co-dissolve the dihydrochalcone and the 95% glycerol liquid. Alternatively, any of the above solvents and solvent mixtures can be used to further dilute the liquified glycerol if so desired. Dissolution of the poly-ols in these solvents can be effected in the manner hereinabove detailed for the dissolution of the dihydrochalcones.

The solution of poly-ol and the solution of dihydrochalcone are then admixed in the proper proportion to provide sweetening compositions having co-dissolved therein from about 1% to about 99%, more preferably from about 3% to about 70%, of said poly-ol, i.e., sugar alcohol or glycerol, as hereinabove disclosed and from about $10^{-6}$ parts to about 1 part dihydrochalcone of Formula II for each part poly-ol, by weight. In the case of sweetening compositions prepared with aqueous-organic solvents, there will be at least 0.1% of the organic solvent in the final composition.

ORGANOLEPTIC EVALUATIONS

As hereinbefore noted, the poly-ols as herein described have a natural sweetness which is less than sucrose. When properly co-solubilized with compounds of Formula II, by means of ingestible polar, organic liquids, as herein detailed the natural sweetness of these poly-ol compounds is enhanced and the resulting solutions are suitable for use as artificial sweeteners. This enhanced sweetness of solutions of the poly-ols containing co-dissolved dihydrochalcones of Formula II was evaluated by volunteer tasters who sampled solutions of various poly-ols co-dissolved with the dihydrochalcones. In this way, it was found that a minimum concentration of about $5 \times 10^{-5}$ molar hesperetin dihydrochalcone or homohesperetin dihydrochalcone is required to enhance the sweetness and improve the flavor perception of poly-ols of Formula I. On a ratio basis, about $10^{-6}$ part dihydrochalcone co-dissolved with one part poly-ol, by weight, is sufficient to enhance the natural sweetness of the poly-ol. Thus, a solution having the weight composition: 60% sorbitol, 1% ethyl alcohol, $6 \times 10^{-5}\%$ hesperetin dihydrochalcone, the remainder being water, is sweeter than a similar composition which does not contain the dihydrochalcone and is approximately equivalent in sweetness to a 60% aqueous solution of sucrose.

It will be seen that sweetening compositions are obtained when a poly-ol and dihydrochalcone of the type herein disclosed are co-dissolved in a weight ratio of at least about 1:$10^{-6}$ poly-ol:dihydrochalcone, in the manner herein disclosed in an ingestible polar, organic liquid, mixtures thereof, and in water containing a concentration of at least about 0.10%, more preferably at least about 0.25% by weight, of said ingestible polar, organic liquids and mixtures thereof such that the final concentration of dissolved poly-ol is in the range as noted above.

The following examples describe sweetening compositions which can be prepared by co-dissolving hesperetin dihydrochalcone and homohesperetin dihydrochalcone with various poly-ols in ingestible organic solvents and mixtures of said solvents with water and their manner of preparation. The examples are only for the purpose of illustration and are not intended to limit the scope of the invention.

Example I 0.2 gram of hesperetin dihydrochalcone is dissolved in 100 g. of ethyl alcohol and 1000 g. of water is admixed therewith; 80 g. of sorbitol is then dissolved in the solution. The resulting solution is suitable for use as a sweetening composition without further treatment.

Example II

Three-fourth gram of hesperetin dihydrochalcone is dissolved in 20 g. of 1,2-dihydroxypropane with gentle warming and 1000 g. of water containing 300 g. dissolved xylitol is added thereto. The resulting solution is suitable for use as a sweetening composition without further treatment.

Example III

A concentrated, non-aqueous sweetening composition having an intense sweetness is prepared in the following manner: 0.1 g. of hesperetin dihydrochalcone is dissolved in 100 g. of ethyl alcohol and 1000 g. glycerol (95%) added thereto. The resulting solution is suitable, without further treatment, for use as a highly concentrated sweetening composition.

Example IV

One-half gram of homohesperetin dihydrochalcone is dissolved in a mixture of 1000 g. of water and 50 g. of sorbitan monooleate polyoxyethylene with gentle warming; 150 g. of xylitol is dissolved in the solution. The resulting solutoin is suitable for use as a sweetening composition without further treatment.

Example V

A vanilla-flavored sweetening composition suitable for simultaneously sweetening and flavoring foodstuffs is prepared as follows: one-tenth part hesperetin dihydrochalcone is dissolved in ten parts vanillin and 500 parts glycerol, and 50 parts mannitol added thereto.

Example VI

One-half part of hesperetin dihydrochalcone is dissolved in 10 parts bitter almond oil and the resulting solution is added to a solution of 700 g. of sorbital in 1000 g. water and provides an almond-flavored sweetening composition.

The bitter almond oil is replaced by oil of sweet birch, oil of spearmint, oil of wintergreen, oil of sassafras, cedarwood oil, anise oil, pine oil, dill oil, celery seed oil, lemon oil, lime oil, orange oil, grapefruit oil, tangerine oil, peppermint oil, clove oil, cassia, carrot seed oil, cola concentrate ginger oil and angelica oil, respectively, and sweetening compositions of the corresponding flavors are secured.

Example VII

One one-thousandth part of homohesperetin dihydrochalcone is dissolved in 10 parts of isoamyl acetate and 1000 parts glycerol (95%) added thereto. The resulting solution provides a banana-flavored sweetening composition.

Example VIII $5 \times 10^{-4}$ moles of hesperetin dihydrochalcone are dissolved in 20 ml. of isoamyl valerate and the resulting solution diluted with 1000 ml. of a solution of 400 g. galactitol dissolved in one liter of water to provide an apple-flavored sweetening composition.

Example IX

One part of hesperetin dihydrochalcone is dissolved in 20 parts of butyl butyrate and added to 50,000 parts glycerol (95%) to provide a pineapple-flavored sweetening composition.

Example X

One-thirty second part of hesperetin dihydrochalcone is dissolved in 1 part of isobutyl propionate and the solution admixed with one liter of a 50% aqueous xylitol solution to provide a rum flavored sweetening composition.

The xylitol is replaced with galactitol, 1,2,3,4-tetrahydroxybutane sorbital and a 1:1 sorbitol-mannitol mixture, respectively, and sweetening compositions are obtained.

Example XI $5 \times 10^{-7}$ moles of hesperetin dihydrochalcone are dissolved in 15 ml. of a synthetic pineapple oil (corresponding to winter fruit) consisting of 2.91 parts ethyl acetate, 0.61 part acetaldehyde, 0.45 part methyl n-valerate, 0.60 part methyl isovalerate, 1.40 parts methyl isocaproate and 0.75 part methyl caprylate and thence diluted to one liter with a solution of 50 parts mannitol in 100 parts water to provide a pineapple-flavored sweetening composition.

Example XII

A sweetening composition having a spearmint flavor is prepared as follows: $5 \times 10^{-4}$ mole of homohesperetin dihydrochalcone is dissolved in 1000 ml. of water in which is dissolved 0.15% spearmint oil and a mixture of 80 g. sorbitol and 120 g. of glycerol (95%) by heating for 10 minutes at 60° C.

Example XIII

A sweetening composition is prepared as follows: 1 mole of hesperetin dihydrochalcone is dissolved in 200 ml. of ethyl alcohol and 100 ml. of glycerol (95%) 150 ml. of water and 50 g. mannitol are co-dissolved therewith.

As illustrated by the foregoing, mixtures of the poly-ols and dihydrochalcones herein disclosed co-dissolved in appropriate organic and aqueous-organic solvents, provide both flavored and unflavored sweetening compositions. These sweetening compositions can, themselves, be ingested but are more often used to sweeten other ingestible materials such as foods, beverages, confections, oral compositions (i.e., dentifrices and mouthwashes) and the like. It will be recognized that co-dissolution of both hesperetin and homohesperetin dihydrochalcones with poly-ols, in the ratios herein disclosed, enhances the sweetness of the poly-ols. However, as hereinbefore noted, many such poly-ols are only marginally sweet when ingested in concentrations below about 3% by weight in ingestible materials. It is therefore preferred to dissolve in an ingestible material at least about 3%, preferably from about 3% to about 70%, by weight, of a poly-ol of Formula I in which is co-dissolved a dihydrochalcone of Formula II in the ratios hereinbefore disclosed. Again, a co-solvent for the poly-ol and dihydrochalcone is needed. Very few foods contain quantities of uncombined polar, organic liquids sufficient to co-solublilize these materials. Hence, it is preferable to sweeten ingestible materials by adding thereto, and solubilizing therein, solutions of poly-ols and dihydrochalcones pre-dissolved in the manner and in the solvents as hereinbefore detailed. Accordingly, a preferred method aspect of the present invention comprises adding to an ingestible material, i.e., a food, beverage, confection, candy and the like, a compound of Formula II co-dissolved with from 3% to 70% of a poly-ol of Formula I in an ingestible organic solvent, or in mixtures of said solvents, and water containing at least 0.10% by weight of said ingestible organic solvent such that the total concentration of poly-ol dissolved in the ingestible material is 3% to about 70% and the total concentration of dihydrochalcone of Formula I dissolved therein is in the ratio range of from about $1:10^{-6}$ to 1:1 poly-ol:dihydrochalcone, on a weight basis. The following examples of foods, beverages and the like, sweetened in this fashion are for the purpose of illustration and are not intended to be limiting of this method aspect of the present invention.

Example XIV

A sweetened beverage is prepared as follows: 0.2 part lemon oil, 0.2 part hesperetin dihydrochalcone, 0.1 part phosphoric acid, 40 parts sorbitol and 100 parts water are co-dissolved.

The lemon oil is replaced by an equivalent amount of lime oil, orange oil, grapefruit oil, tangerine oil, oil of sweet birch, oil of spearmint, oil of wintergreen, oil of sassafras, cedarwood oil, anise oil, pine oil, dill oil, celery seed oil, peppermint oil, clove oil, cassia, carrot seed oil, cola concentrate, ginger oil and angelica oil, and mixtures thereof, respectively, and beverages of the corresponding flavors are obtained.

Example XV

A sweetened orange juice concentrate is prepared as follows: 80% of the water from expressed orange juices is removed by flash evaporation; thereinafter a sweetening composition consisting of 0.001 part hesperetin dihydrochalcone dissolved in 2 parts 1,2-propylene glycol, 20 parts xylitol and 77.99 parts water is added to the orange juice concentrate in the ratio of 10 parts orange concentrate to 1 part sweetening composition.

Example XVI

A sweetened pastry topping is prepared as follows: 0.001 part of homohesperetin dihydrochalcone is dissolved in 1.0 part bitter almond extract and the resulting solution is dissolved in 100 parts glycerol (95%). The solution is then admixed with a glaze prepared from equal parts water, corn starch and sorbitan monooleate polyoxyethylene.

Example XVII

Brewed coffee and tea are sweetened as follows: a sufficient volume of the sweetening composition described in Example I is added to coffee and tea, respectively, such that the final concentration of dissolved sorbitol is 3% by weight of the brewed beverage, or greater, according to taste.

Example XVIII

A sweetened gelatin dessert is prepared as follows: a sufficient volume of the sweetening composition described in Example II is added to a liquified gelatin solution such that the final concentration of dissolved xylitol in the solution is 3% by weight, or greater, according to taste; the solution is gelled by chilling.

Example XIX

A sweet-sour salad dressing is prepared as follows: in 100 parts vinegar are dissolved 0.001 part homohesperetin dihydrochalcone, 0.1 part 3-decen-2-one, 30 parts sorbitol and 150 parts liquid salad oil.

Example XX

An anticaries dentifrice composition sweetened and flavored in the manner of this invention has the composition:

|  | Percent |
|---|---|
| Sodium fluoride | 0.1 |
| Calcium pyrophosphate | 45.9 |
| Sorbitol (70% aqueous solution) | 25.0 |
| Glycerol (95% aqueous solution) | 15.0 |
| Spearmint oil | 0.2 |
| Clove oil | 0.01 |
| Homohesperetin dihydrochalcone | 0.1 |
| Water to 100%. | |

Example XXI

An anticaries mouthwash is sweetened as follows: In a solution comprising 0.1% sodium fluoride, 30% sorbitol (70% aqueous solution), 0.2% peppermint oil, 20% ethyl alcohol, 9.7% glycerol (95%), 35% water and 5% sorbitan monooleate polyoxyethylene is dissolved hesperetin dihydrochalcone in a weight ratio of 1000 parts solution to one part of the dihydrochalcone.

What is claimed is:

1. A liquid sweetening composition comprising: (1) from about 1% to about 99% of a poly-ol compound of the formula $HOCH_2(CHOH)_nCH_2OH$ wherein $n$ is 1 to 4; (2) a dihydrochalcone compound selected from the group consisting of hesperetin dihydrochalcone and homohesperetin dihydrochalcone at a weight ratio of poly-ol: dihydrochalcone in the range from about $1:10^{-6}$ to $1:1$; and (3) the balance of said composition being a solvent selected from the group consisting of ingestible polar, organic liquids and mixtures of ingestible polar, organic liquids and water, said mixtures containing at least about 0.1% of said ingestible polar, organic liquids.

2. A composition according to claim 1 where the weight ratio of poly-ol to dihydrochalcone compound is in the range of $1:10^{-6}$ to $1:10^{-3}$.

3. A composition according to claim 1 containing from about 3% to about 70% of a poly-ol compound selected from the group consisting of xylitol, sorbitol, mannitol and glycerol.

4. A composition accoding to claim 1 wherein the ingestible polar, organic liquid so-solvent is selected from the group consisting of liquid alcohols, glycols, low molecular weight organic acids, orangic acid esters, aldehydes, ketones, and mixtures thereof.

5. A composition according to claim 1 wherein the ingestible polar, organic liquid is selected from the group consisting of ethyl alcohol, 1,2-dihydroxypropane, acetic acid, isoamyl acetate, isoamyl valerate, butyl butyrate, isobutyl propionate, sorbitan monooleate polyoxyethylene and mixtures thereof.

6. A composition according to claim 1 wherein the ingestible polar, organic liquid co-solvent is a member selected from the group consisting of oil of sweet birch, oil of spearmint, oil of wintergreen, oil of sassafras, cedarwood oil, anise oil, pine oil, dill oil, celery seed oil, lemon oil, orange oil, lime oil, grapefruit oil, clove oil, peppermint oil, tangerine oil, cassia, carrot seed oil, cola concentrate, ginger oil and angelica oil.

7. A composition according to claim 1 wherein the co-solvent is water containing at least about 0.1% of an ingestible polar, organic liquid.

8. A composition according to claim 1 wherein the solvent is water containing more than about 0.1% of an ingestible polar, organic liquid selected from the group consisting of orange oil, lemon oil, lime oil, grapefruit oil, spearmint oil, peppermint oil, clove oil, ethyl alcohol, 1,2-dihydroxypropane, acetic acid, isoamyl acetate, isoamyl valerate, butyl butyrate, isobutyl propionate, sorbitan monooleate polyoxyethylene and mixtures thereof.

9. A process for enhancing the sweetness of poly-ol compounds of the formula $HOCH_2(CHOH)_nCH_2OH$ wherein $n$ is 1 to 4, comprising co-dissolving therewith a member selected from the group consisting of hesperetin dihydrochalcone and homohesperetin dihydrochalcone in a weight ratio of poly-ol compound to dihydrochalcone in the range from about $1:10^{-6}$ to $1:1$ in a solvent selected from the group consisting of ingestible polar, organic liquids and mixtures of ingestible polar, organic liquids and water, said mixtures containing at least about 0.1% by weight of said ingestible polar, organic liquids.

10. A process according to claim 9 where the weight ratio of poly-ol to dihydrochalcone compound is in the range of $1:10^{-6}$ to $1:10^{-3}$.

11. A process according to claim 9 wherein the poly-ol compound is selected from the group consisting of glycerol, xylitol, sorbitol and mannitol.

12. A process according to claim 9 wherein the ingestible polar, organic liquid is selected from the group consisting of liquid alcohols, glycols, low molecular weight organic acids, organic acid esters, aldehydes, ketones, and mixtures thereof.

13. A process according to claim 9 wherein the ingestible polar, organic liquid is selected from the group consisting of ethyl alcohol, 1,2-dihydroxypropane, acetic acid, isoamyl acetate, isoamyl valerate, butyl butyrate, isobutyl propionate, sorbitan monooleate polyoxyethylene and mixtures thereof.

14. A process according to claim 9 wherein the ingestible polar, organic liquid is selected from the group consisting of oil of sweet birch, oil of spearmint, oil of wintergreen, oil of sassafras, cedarwood oil, anise oil, pine oil, dill oil, celery seed oil, lemon oil, orange oil, lime oil, grapefruit oil, clove oil, peppermint oil, tangerine oil, cassia, carrot seed oil, cola concentrate, ginger oil and angelica oil.

15. A process according to claim 9 wherein the solvent consists essentially of water containing at least 0.1% of an ingestible polar, organic liquid.

16. A process according to claim 9 wherein the solvent is water containing at least 0.1% of an ingestible polar, organic liquid selected from the group consisting of orange oil, lemon oil, lime oil, grapefruit oil, spearmint oil, peppermint oil, clove oil, ethyl alcohol, 1,2-dihydroxypropane, acetic acid, isoamyl acetate, isoamyl valerate, butyl butyrate, isobutyl propionate, sorbitan monooleate polyoxyethylene and mixtures thereof.

17. A process for sweetening foods, beverages, confections, dentifrices and mouthwashes comprising adding thereto the composition of claim 1 such that the final concentration of dissolved poly-ol therein is at least about 3%, by weight.

18. A process according to claim 17 wherein the poly-ol compound is selected from the group consisting of glycerol, xylitol, sorbitol and mannitol.

19. A process according to claim 17 wherein the solvent is selected from the group consisting of the natural flavor oils, ethyl alcohol, 1,2-dihydroxypropane, acetic acid, sorbitan monooleate polyoxyethylene and liquid organic acid esters.

References Cited

UNITED STATES PATENTS

| | | | |
|---|---|---|---|
| 3,296,079 | 1/1967 | Griffin | 167—93 |
| 2,629,665 | 2/1956 | Gordon | 99—186 |
| 3,429,873 | 2/1969 | Horowitz et al. | 260—210 |

JOSEPH M. GOLIAN, Primary Examiner

U.S. Cl. X.R.

99—141 A